(12) United States Patent
Huffman et al.

(10) Patent No.: US 12,455,198 B2
(45) Date of Patent: Oct. 28, 2025

(54) ORIENTATION-INDEPENDENT TEMPERATURE SENSOR

(71) Applicant: Temptime Corporation, Morris Plains, NJ (US)

(72) Inventors: Brian S. Huffman, Belle Mead, NJ (US); Deniz Boyu, Dover, NJ (US); Gene A. Hofer, Lake Zurich, IL (US)

(73) Assignee: ZEBRA TECHNOLOGIES CORPORATION, Lincolnshire, IL (US)

( * ) Notice: Subject to any disclaimer, the term of this patent is extended or adjusted under 35 U.S.C. 154(b) by 554 days.

(21) Appl. No.: 17/896,383

(22) Filed: Aug. 26, 2022

(65) Prior Publication Data

US 2024/0068886 A1 Feb. 29, 2024

(51) Int. Cl.
  *G01K 11/06* (2006.01)
  *A23L 3/00* (2006.01)
  *G01K 1/024* (2021.01)
  *G01K 3/04* (2006.01)
  *H01Q 1/22* (2006.01)

(52) U.S. Cl.
  CPC .............. *G01K 11/06* (2013.01); *G01K 1/024* (2013.01); *H01Q 1/2225* (2013.01)

(58) Field of Classification Search
  CPC ....... G01K 11/06; G01K 1/024; H01Q 1/2225
  USPC ......................................... 116/216, 217, 219
  See application file for complete search history.

(56) References Cited

U.S. PATENT DOCUMENTS

| | | |
|---|---|---|
| 4,830,855 A | 5/1989 | Stewart |
| 5,120,349 A | 6/1992 | Stewart et al. |
| 5,156,911 A | 10/1992 | Stewart |
| 5,783,302 A | 7/1998 | Bitlel et al. |
| 10,095,972 B2 * | 10/2018 | Bhatia ............... G06K 19/07745 |
| 2014/0144366 A1 * | 5/2014 | Huffman ................ G01K 11/06 116/216 |
| 2017/0205295 A1 * | 7/2017 | Newport ................ G01K 11/06 |
| 2019/0034777 A1 * | 1/2019 | Bhatia ................ G06K 19/0717 |

FOREIGN PATENT DOCUMENTS

| | | | |
|---|---|---|---|
| DE | 102013108557 B3 * | 11/2014 | ............. G01K 11/06 |
| WO | 2010/068279 | 6/2010 | |
| WO | 2020/231921 | 11/2020 | |

OTHER PUBLICATIONS

Search Report and Written Opinion dated Jan. 3, 2024 issued for International PCT Application No. PCT/US23/30972.

* cited by examiner

*Primary Examiner* — Peter J Macchiarolo
*Assistant Examiner* — Mireille S Sadate-Moualeu
(74) *Attorney, Agent, or Firm* — K&L Gates LLP

(57) ABSTRACT

A temperature exposure indicator includes a substrate, a first electrode and a second electrode on the substrate, the second electrode spaced apart from the first electrode, a temperature responsive material disposed between the first electrode and the second electrode, wherein the temperature responsive material comprises an insulating material and conductive particles, and an absorbent coupled to the temperature responsive material. In response to exposure to a temperature above a predetermined threshold temperature, at least a portion of the insulating material of the temperature responsive material is absorbed into the absorbent coupled to the temperature responsive material, changing an electrical property of the temperature responsive material.

25 Claims, 10 Drawing Sheets

ORIENTATION-INDEPENDENT TEMPERATURE SENSOR

BACKGROUND

Many commercial products are sensitive to temperature conditions, such as freezing, thawing, high or low temperatures, and/or extended periods of time at an elevated temperature, and they may lose efficacy or quality under any of these conditions. Examples of temperature-sensitive commercial products include certain pharmaceuticals, medical products, and foodstuffs, as well as some industrial products. There is a continued need for an environmental temperature indicator to detect such changes. It is desirable for some products, which can survive a short exposure to high temperature excursion, to detect when a high temperature excursion of longer than a certain time period has occurred.

SUMMARY

The present disclosure provides new and innovative orientation-independent temperature exposure indicators and systems for providing an indication of exposure to temperature changes and methods for manufacturing the same. In some examples, a temperature exposure indicator may include a substrate, a first electrode and a second electrode on the substrate, the second electrode spaced apart from the first electrode, a temperature responsive material disposed between the first electrode and the second electrode, wherein the temperature responsive material comprises an insulating material and conductive particles, and an absorbent coupled to the temperature responsive material. In response to exposure to a temperature above a predetermined threshold temperature, at least a portion of the insulating material of the temperature responsive material is absorbed into the absorbent coupled to the temperature responsive material, changing an electrical property of the temperature responsive material.

In some examples, a method for manufacturing a temperature exposure indicator may include providing a substrate with a first electrode and a second electrode spaced apart from the first electrode, depositing a first layer of a temperature responsive material on the substrate so that the first layer of the temperature responsive material is disposed between the first electrode and the second electrode, quenching the first layer at a first temperature, depositing a second layer of the temperature responsive material on the first layer, and providing an absorbent material so that the absorbent material is coupled to the temperature responsive material. The second layer may be spaced apart from at least one of the first electrode and the second electrode. The first layer and the second layer together may form the temperature responsive material. The temperature responsive material may include an insulating material and conductive particles. The insulating material may be configured, in response to exposure to a temperature above a predetermined threshold temperature, to change a state from solid or semi-solid to liquid or semi-liquid so that at least a portion of the insulating material of the temperature responsive material is absorbed into the absorbent material, changing an electrical property of the temperature exposure indicator.

Additional features and advantages of the disclosed systems are described in, and will be apparent from, the following Detailed Description and the Figures.

DETAILED DESCRIPTION OF EXAMPLE EMBODIMENTS

Figure 1:
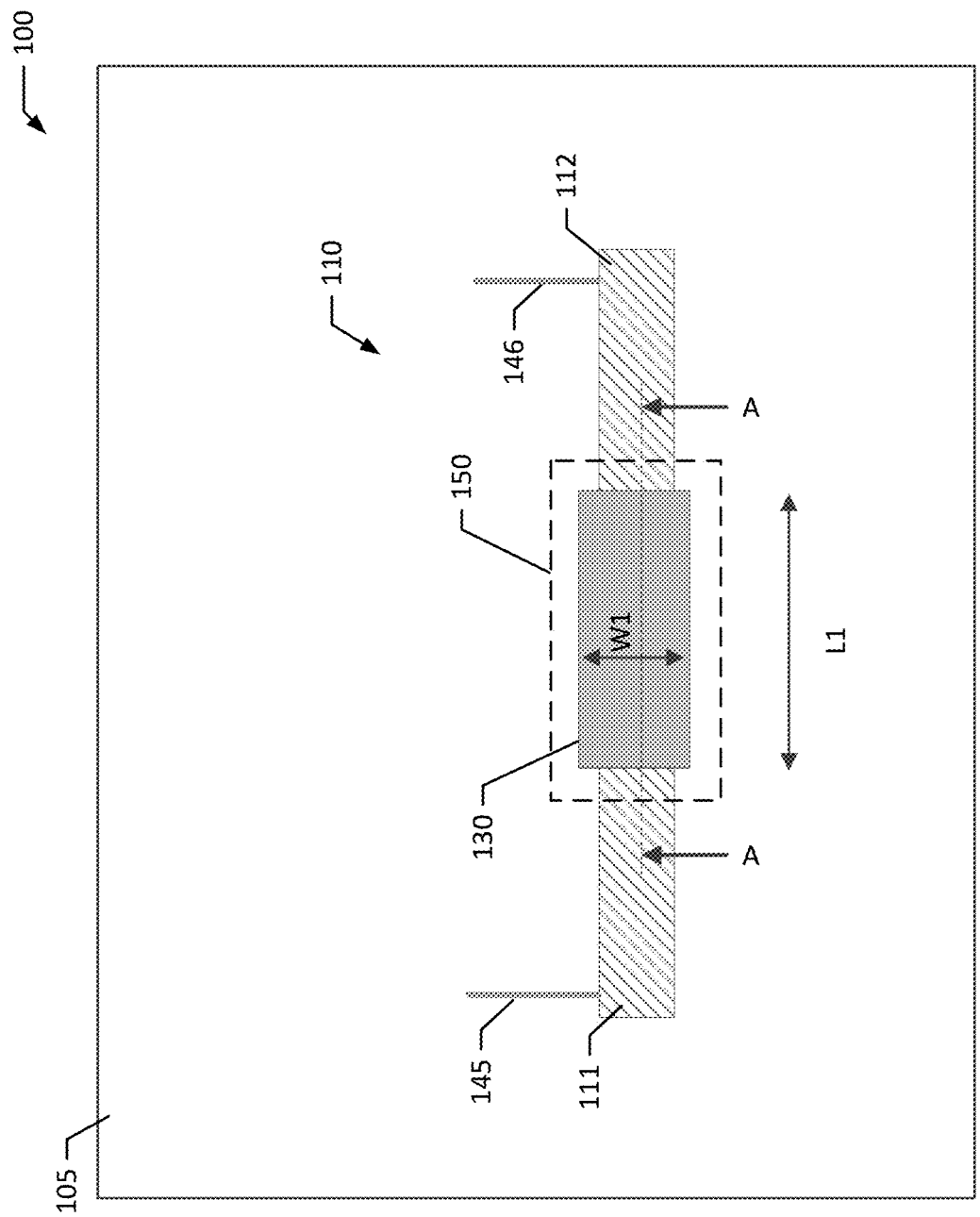
FIG. 1 is a diagram of a temperature exposure indicator according to an example embodiment of the present disclosure.

Many vaccines, drugs, foodstuffs, and other products are temperature-sensitive, or perishable, and can lose quality with time at rates that are influenced by ambient temperatures. To help mitigate problems associated with undesirable temperature conditions, a temperature exposure indicator can be associated with the vaccines, drugs, foodstuffs, or other host products that are thermally sensitive, to provide an alert to a health worker, or other end-user, that the products may have lost potency and possibly should not be used.

It may be desirable to have an indicator that reports historical temperature exposure, e.g., whether the temperature of the product has exceeded a threshold temperature, which may damage certain products. In other situations, it may be desirable to have an indicator that reports if a product is above, or has recently exceeded, a threshold temperature, somewhat analogous to a thermometer. These indicators may be provided in a variety of forms, e.g., optically readable indicators where an indication can be detected by the human eye, or by a machine imaging or scanning system. In other cases, either alone or in combination with such optical indicators, indicators that signal historical or current temperature with either an electrical signal or a radio signal, such as a signal provided by a RFID, may be provided. The implementation of such electrical or radio indicators may be facilitated by the use of resistors, capacitors, or other electrical components that significantly change resistance, capacitance, or other electrical property in response to temperature exposure above a threshold. In some cases, the response may be irreversible, i.e., the changed electrical property does not return to its original value after the threshold exposure ends.

If an RFID tag is orientation dependent (e.g., only working well when it is position upright according to the manufacturing design), the tag may not function well when the RFID tag is in a wrong orientation. For example, in some cases, an orientation dependent RFID tag may be attached to a package or product. However, if the package or product, to which the orientation dependent RFID tag is adhered, is accidently turned upside or knocked over, which is common during a shipping process, the orientation dependent RFID tag may malfunction. Many historical temperature exposure indicators involve materials that melt at particular temperatures. Subsequent movement of a liquid, either by flow, capillary action, or diffusion may be part of the operation of the indicator. However, indicators that employ liquids, particularly liquids that are intended to flow from one location to another, are more likely to have significant orientation dependency, so that they behave differently, or perhaps do not operate properly at all in certain orientations.

Aspects of the present disclosure may address the above-discussed issues in the orientation dependent RFID tag. For example, in some examples, a temperature exposure indicator/RFID tag according to the present disclosure may include, a first electrode, a second electrode spaced apart from the first electrode, temperature responsive material (e.g., conductive particles within a non-conductive polymer matrix) disposed between the first and second electrodes, and a wick/porous component attached to the temperature responsive material. With this structure/configuration, the temperature exposure indicator/RFID tag may not be dependent on gravity, but may rely more on the diffusion of the temperature responsive material (e.g., into the wick component). For example, the diffusion of the non-conductive polymer matrix in the temperature responsive material into the wick component (e.g., in response to exposure to a temperature above a predetermined threshold temperature) may leave behind the conductive particles, which may create a conductive path between the first and second electrodes, changing the resistance/capacitance of the temperature exposure indicator/RFID tag. In this way, aspects of the present disclosure may allow for a proper response to occur regardless of the orientation of the temperature exposure indicator/RFID tag.

Figure 2:
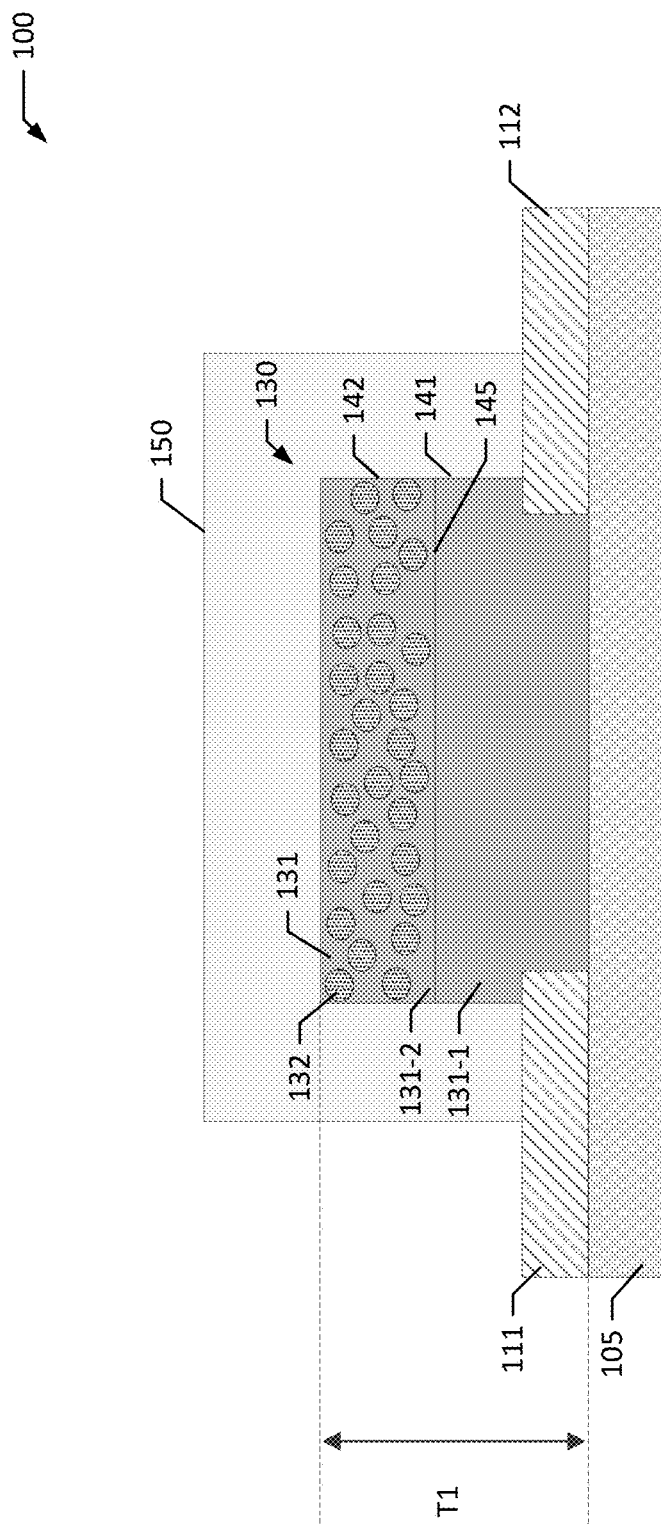
FIG. 2 is an example of a cross-sectional view of the temperature exposure indicator of FIG. 1 along the line of A-A before the temperature exposure indicator is exposed to a temperature above a threshold temperature.
Figure 3:
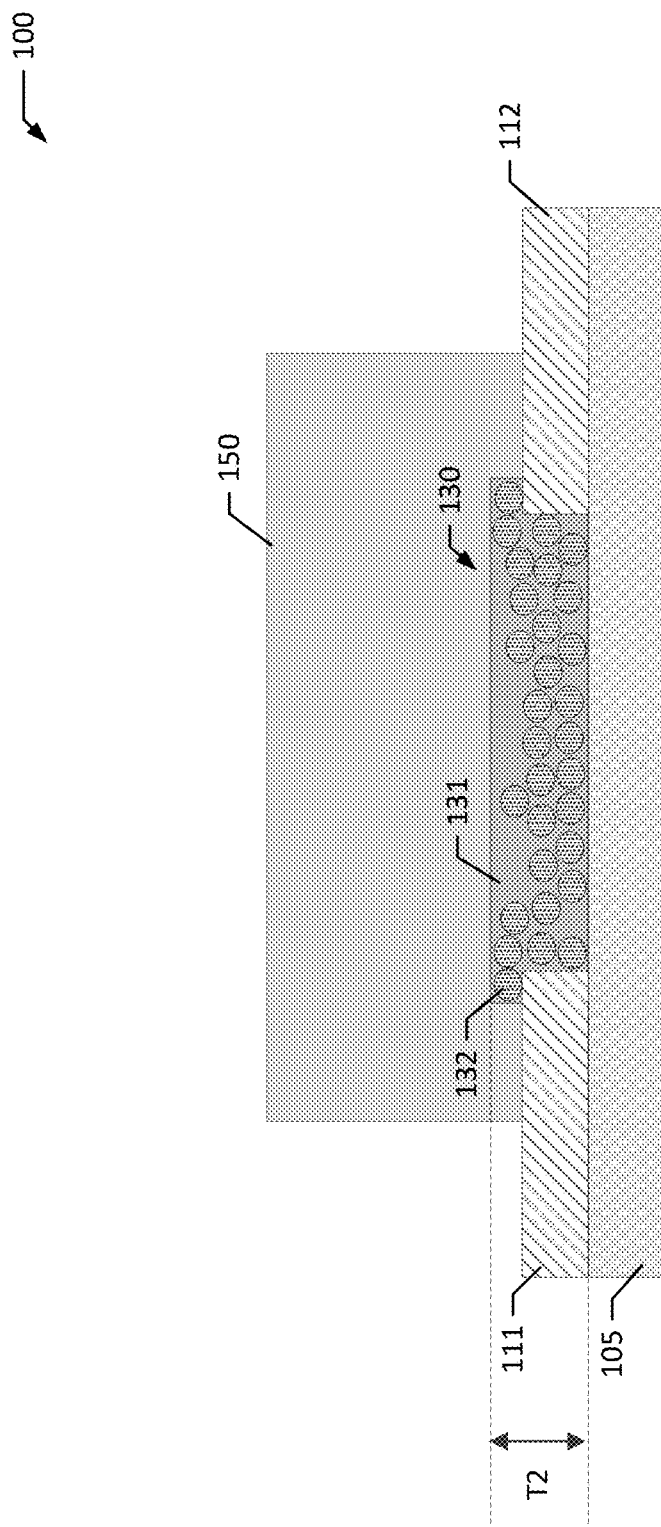
FIG. 3 is an example of a cross-sectional view of the temperature exposure indicator of FIG. 1 along the line of A-A after the temperature exposure indicator is exposed to a temperature above a threshold temperature.

FIGS. 1 to 3 depict an example temperature exposure indicator 100 in accordance with one or more aspects of the present disclosure. The temperature exposure indicator 100 may include a first electrode 111 and a second electrode 112 spaced apart from the first electrode 111. In some examples, the first electrode 111 may be connected to a first contact terminal 145, and the second electrode 112 may be connected to a second contact terminal 146. In some examples, the first electrode 111 and the second electrode 112 may be made with metal (e.g., copper, aluminum, silver, gold), graphite, conductive polymers, or any other suitable conducting materials.

In some examples, the temperature exposure indicator 100 may further include a temperature responsive material 130 and an absorbent 150 coupled to the temperature responsive material. The absorbent 150 is shown as transparent in FIG. 1 for illustrative purpose, but the absorbent 150 may or may not be transparent. The temperature responsive material 130 may be disposed (e.g., spatially and/or electrically) between the first and second electrodes 111, 112. The temperature responsive material 130 may include an insulating material 131 and conductive particles 132. As shown in FIGS. 1-3, in some examples, the temperature responsive material 130 may overlap at least a portion of the first and/or second electrode 111/112. In other examples, there may be no overlap between the temperature responsive material 130 and the first/second electrode 111/112, for example the material may fill all or part of a gap between the electrodes. In some examples, in response to exposure to a temperature above a predetermined threshold temperature, at least a portion of the insulating material 131 of the temperature responsive material 130 may melt or liquefy, and may be absorbed into the absorbent 150. This may change an electrical property of the remaining temperature responsive material 130, which will be discussed in more detail below.

In some examples, the length L1 or the width W1 of the temperature responsive material 130 may be in a range of about 0.025 to 3.0 inches, for example, about 0.025 to about 0.05 inches, about 0.05 to about 0.075 inches, about 0.075 to about 0.1 inches, about 0.1 to about 0.125 inches, about 0.09 to about 0.11 inches, about 0.125 to about 0.15 inches, about 0.15 to 0.5 inches, about 0.5 to 1.0 inches, about 1.0 to 1.5 inches, about 1.5 to 2.0 inches, about 2.0 to 2.5 inches, or about 2.5 to 3.0 inches. In other examples, the length L1 or the width W1 of the temperature responsive material 130 may have any other suitable value. In some examples, the thickness (e.g., T1) of the temperature responsive material 130 may be about 0.1 to about 0.5 mil, about 0.5 to about 1.5 mil, about 1.5 to about 5.0 mil, or about 5.0 to about 10.0 mil. In other examples, the temperature responsive material 130 may have any other suitable thickness. It will be appreciated that adjusting the thickness of the temperature responsive material 130 (in particular, the thickness of the first layer 141, as discussed in more detail below) may allow tuning the delay required for the change of the electrical property of the temperature responsive material 130 (and, ultimately, the temperature exposure indicator 100).

In some examples, the temperature responsive material 130 may include a first layer 141 and a second layer 142. The first layer 141 may include a first part 131-1 of the insulating material 131. The second layer 142 may include a second part 131-2 of the insulating material 131 and the conductive particles 132. The second layer 142 may be disposed on the first layer 141. The second layer 142 may be spaced apart from at least one of the first and second electrodes 111, 112. For example, the first layer 141 may serve as a barrier by being disposed between the second layer 142 and at least one of the first and second electrodes 111, 112. In some examples, the temperature responsive material 130 may further include an interface 145 that is formed between the first layer 141 and the second layer 142. The interface 145 may be formed during a manufacturing process of the temperature exposure indicator, which will be discussed in more detail below.

In some examples, a concentration of the conductive particles 132 within the second layer 142 may be in a range of 30% to 95% by weight or volume (with respect to the total weight or volume of the second layer 142), for example, 85% to 95%, 75% to 85%, 65% to 55%, 55% to 45%, 45% to 35%, or 35% to 30%. In other examples, the conductive particles 132 may have any other suitable concentration value within the second layer 142. In some examples, the concentration of the conductive particles 132 may be determined to have sufficient conductive particles 132 within the second layer 142 so that the temperature responsive material 130 conducts well enough in the activated state (e.g., above the threshold temperature) after at least a portion of the insulating material 131 is absorbed into the absorbent 150 while the temperature responsive material 130 does not conduct in the inactivated state (e.g., below the threshold temperature).

In some examples, a volume or weight ratio of the conductive particles 132 to the second part 131-2 of the insulating material 132 within the second layer 142 may be in a range of about 95:5 to about 30:70, for example, about 95:5 to about 85:15, about 85:15 to about 75:25, about 75:25 to about 65:35, about 65:35 to about 55:45, about 55:45 to about 45:55, about 45:55 to about 35:65, about 35:65 to about 30:70.

In some examples, a substrate 105 may be provided, and the temperature exposure indicator 100 may be disposed on or in the substrate 105. In some examples, the substrate 105 may be made with a material into which the insulating material 131 and the conductive particles 132 cannot be absorbed. Examples of the material for the substrate 105 may include, but not limiting to, polyethylene terephthalate (PET), polypropylene (PP), and biaxially-oriented polypropylene (BOPP). In other examples, the substrate 105 may be made with any other suitable material (e.g., any material into which the insulating material 131 and the conductive particles 132 cannot be absorbed). In some examples, the substrate 105 may be the surface of a package for a product to be monitored, e.g., incorporating the feature directly in a box or other packing container, or a label material, e.g., an adhesive-backed label that may be applied to a package or product.

FIG. 2 is an example of a cross-sectional view of the temperature exposure indicator of FIG. 1 along the line of A-A before the temperature exposure indicator is exposed to a temperature above a threshold temperature. FIG. 3 is an example of a cross-sectional view of the temperature exposure indicator of FIG. 1 along the line of A-A after the temperature exposure indicator is exposed to a temperature above a threshold temperature.

As illustrated in FIGS. 2 and 3, as a portion of the insulating material 131 of the temperature responsive material 130 (a portion of at least one or both of the first and second parts 131-1, 131-2) is absorbed into the absorbent 150 in response to exposure to the temperature above the predetermined threshold temperature, the conductive particles 132 in the second layer 142 may move toward the substrate 105 and closer to the first and second electrodes 111, 112. This may cause the change in electrical property of the temperature exposure indicator. Also, as the portion of the insulating material 131 of the temperature responsive material 130 (a portion of at least one or both of the first and second parts 131-1, 131-2) is absorbed into the absorbent 150 in response to exposure to the temperature above the predetermined threshold temperature, an amount of the insulating material 131 separating the conductive particles 132 from at least one of the first and second electrodes 111, 112 may be reduced, which may also cause the change in electrical property of the temperature exposure indicator. Moreover, as the portion of the insulating material 131 of the temperature responsive material 130 (a portion of at least one or both of the first and second parts 131-1, 131-2) is absorbed into the absorbent 150 in response to exposure to the temperature above the predetermined threshold temperature, an interstitial space between the conductive particles 132 may be reduced.

Not wishing to be bound by theory, it is believed that one or more of the above-discussed changes (the conductive particles 132 moving closer to the first/second electrodes, reduction of the insulating material 131 separating the conductive particles 132 from the first/second electrode 111, 112, and/or reduction of the interstitial space between the conductive particles 132) may create a conductive path (formed by the accumulated conductive particles) between the first electrode 111 and the second electrode 112, which may cause a change in electrical property of the (remaining/non-absorbed) temperature responsive material 130 (e.g., a resistivity or a dielectric constant of the remaining temperature responsive material 130) and, ultimately, the temperature exposure indicator 100 (e.g., resistance or capacitance of the temperature exposure indicator 100).

For example, the resistance of the temperature exposure indicator 100 (between the first and second electrodes 111, 112) may be changed from a first resistance value (e.g., infinite) to a second resistance value (e.g., 5-10 ohms) after exposure to the temperature above the threshold temperature. The first resistance value may be greater than the second resistance value.

In some examples, the capacitance of the temperature exposure indicator 100 (between the first and second electrodes 111, 112) may be changed from a first capacitance value (e.g., 20-50 pF) to a second capacitance value (e.g., 5-10 pF) after exposure to the temperature above the threshold temperature. The first capacitance value may be greater than the second capacitance value.

As illustrated in FIGS. 2 and 3, the thickness of the temperature responsive material 130 may be reduced after the temperature exposure indicator 100 is exposed to a temperature above a threshold temperature (from T1 to T2) as a portion of the temperature responsive material 130 is absorbed into the absorbent 130. In some examples, a concentration of the conductive particles 132 within the temperature responsive material 130 by weight or volume before the temperature exposure indicator 100 is exposed to the temperature above the predetermined threshold temperature may be in a range of about 20% to about 60%, for example, about 20% to about 30%, about 30% to about 40%, about 40% to about 50%, or about 50% to about 60%. In some examples, a concentration of the conductive particles 132 within the temperature responsive material by weight or volume after the temperature exposure indicator 100 is exposed to the temperature above the predetermined threshold temperature may be in a range of about 60% to about 99%, for example, about 60% to about 70%, about 70% to about 80%, about 80% to about 90%, or about 90% to about 99%. In other examples, the conductive particles 132 may have any other suitable concentration within the temperature responsive material before or after the temperature exposure indicator 100 is exposed to the temperature above the predetermined threshold temperature.

In some examples, in response to exposure to the temperature above the predetermined threshold temperature, the insulating material 131 may change its state from a solid or semi-solid to a liquid or a semi-liquid. In some examples, the insulating material 131 may be made of a solid or semi-solid with a melting point at or around the threshold temperature and that can be absorbed into the absorbent 150, for example, when it is melted. For example, the insulating material 131 may be made with a polymer matrix having a side-chain crystalline polymer (SCC). In some examples, the polymer matrix may further include at least one of alkane and microcrystalline wax.

The side-chain crystalline polymers can provide a relatively sharp transition from the solid state to the liquid state. The side-chain crystalline polymer structures, e.g., the number and length of side chains, are very controllable based on synthesis parameters and, thus, the properties of the side-chain crystalline polymers (e.g., melting point, tightness of the transition, viscosity, etc.) are readily tuned. The melting range of the side-chain crystalline polymers generally is indicative of the sharpness of the solid state to liquid state transition. In some examples, the side-chain crystalline polymers may have a relatively narrow melting range, for example, a melting range of about 10° C., about 5° C., about 2° C., about 1° C., or about 0.5° C. The side-chain crystalline polymers can also have a relatively low melting temperature, such as about 55° C. to about 65° C., about 57.5° C. to about 62.5° C., about 45° C. to about 55° C., about 42.5° C. to about 47.5° C., about 35° C. to about 45° C., about 25° C. to about 35° C., about 27.5° C. to about 32.5° C., about 10° C. to about 25° C., about 65° C. or less, about 60° C. or less, about 55° C. or less, about 50° C. or less, about 45° C. or less, about 40° C. or less, about 35° C. or less, about 30° C. or less, about 25° C. or less, about 20° C. or less, about 15° C. or less, or about 10° C.

Not wishing to be bound by theory, it is believed that after exposure to a threshold temperature for a sufficient period of time, the insulating material (e.g., side-chain crystalline polymers) may melt and can be absorbed into the absorbent 150. As used herein, the term "melting temperature" or "melting point" may refer to the temperature at which a material exhibits peak unit heat absorption per degree Celsius, as determined by differential scanning calorimetry. Above its melting temperature, the material can exhibit liquid properties and below its melting temperature, the material can exhibit solid properties. As used herein, the term "melting temperature range" may refer to the temperature range from the melt onset temperature to the melting temperature of a material. As used herein, the term "melt onset temperature" may refer to the temperature at which the meltable material begins to exhibit an increase in unit heat absorption per degree Celsius, as determined by differential scanning calorimetry. Below its melt onset temperature, the material can be solid. The insulating material (e.g., side-chain crystalline polymers) can have a melting temperature close to the threshold temperature of the temperature exposure indicator 100.

Suitable insulating materials (e.g., side-chain crystalline polymers) may include polymers and copolymers of methacrylates and acrylates, having linear aliphatic side chains capable of becoming crystalline at a temperature of interest, for example, a temperature in the range of from about 10° C. to about 65° C. The side chains can have at least 10 carbon atoms, for example, from about 10 to about 30 carbon atoms, such as 10 to 30 carbon atoms, 10 to 24 carbon atoms, 10 to 22 carbon atoms, 10 to 20 carbon atoms, 12 to 18 carbon atoms, 14 to 16 carbon atoms, 14 to 18 carbon atoms, 16 to 18 carbon atoms, 12 to 16 carbon atoms, or 14 to 16 carbon atoms. Some examples of such polymers include poly(alkylmethacrylates) such as poly(hexadecylmethacrylate) or poly(octadecylmethacrylate), poly(alkylacrylates) such as poly(tetradecylacrylate), poly(hexadecylacrylate), or poly(dodecylacrylate), copolymers such as a copolymer of hexadecylacrylate and octadecylmethacrylate, poly(hexyl-co-dodecylacrylate), a copolymer of tetradecylacrylate and octadecylacrylate, a copolymer of hexadecylmethacrylate and octadecylmethacrylate, and a copolymer of tetradecylacrylate and hexadecylacrylate. Mixtures of two or more of any of the side-chain crystallizable polymers described herein can also be used. Examples of side-chain crystalline polymers also are disclosed in U.S. patent application Ser. No. 14/167,394, titled TIME-TEMPERATURE INDICATOR COMPRISING A SIDE CHAIN CRYSTALLINE POLYMER (Huffman et al.), filed Jan. 29, 2014, which is herein incorporated by reference in its entirety.

The characteristics of the insulating material (e.g., side-chain crystalline polymers) can be adjusted by introducing crosslinking into the polymer structure by including one or more crosslinking agents in the polymerization process. For example, a bifunctional acrylic or methacrylic ester, or other suitable compound, such as hexanediol diacrylate, can be included in the polymerization process to function as a crosslinking agent and yield a crosslinked polymer product. In some cases, a relatively low crosslink density, for example, from about 0.01 to about 0.09 intermolecular crosslinks per polymer chain, or weight average molecular weight, can be used.

As used herein, the term "molecular weight" may reference a weight average molecular weight, unless the context indicates a number average molecular weight. The insulating material (e.g., side-chain crystalline polymers) can have a molecular weight of at least about 1,000 Da, such as at least about 1,500 Da, at least about 2,000 Da, or at least about 5,000 Da. In some examples, the insulating material (e.g., side-chain crystalline polymers) may have a molecular weight in a range of about 2,000 Da to about 300,000 Da, such as about 3,000 Da to about 300,000 Da, about 5,000 Da to about 250,000 Da, about 10,000 Da to about 200,000 Da, about 15,000 Da to about 150,000 Da, about 20,000 Da to about 120,000 Da, about 30,000 Da to about 100,000 Da, about 50,000 Da to about 80,000 Da, about 2,000 Da to about 20,000 Da, about 3,000 Da to about 15,000 Da, about 4,000 Da to about 10,000 Da, about 4,000 Da to about 5,000 Da, about 5,000 Da to about 6,000 Da, about 6,000 Da to about 7,000 Da, about 7,000 Da to about 8,000 Da, about 8,000 Da to about 9,000 Da, about 9,000 Da to about 10,000 Da, about 2,000 Da to about 10,000 Da, about 10,000 Da to about 20,000 Da, about 20,000 Da to about 30,000 Da, about 30,000 Da to about 50,000 Da, about 50,000 Da to about 100,000 Da, about 100,000 Da to about 150,000 Da, about 150,000 Da to about 200,000 Da, about 200,000 Da to about 250,000 Da, or about 250,000 Da to about 300,000 Da.

In general, higher molecular weight insulating material (e.g., side-chain crystalline polymers) can have a higher viscosity when in the liquid state at a temperature near its melting point than the corresponding insulating material with a lower molecular weight. Thus, the characteristics of the insulating material can also be adjusted by varying the molecular weight of the insulating material. More details about the insulating material (e.g., side-chain crystalline polymers) are disclosed in international patent publication no. WO2020/231921, titled TEMPERATURE INDICATOR WITH ELECTROCHEMICAL SWITCH (Huffman et al.), filed May 11, 2020, which is herein incorporated by reference in its entirety.

In some examples, the conductive particles 132 may be made with copper, aluminum, silver, and/or gold. In other examples, the conductive particles 132 may be made with any other suitable conductive materials.

In some examples, the temperature responsive material 130 may have a shape, such as a circle, a rectangular, a square, a trapezoid, or a triangle. In other examples, the temperature responsive material 130 may have any other suitable shape.

In some examples, the absorbent 150 may be disposed above and/or on the sides of the temperature responsive material 130. In some examples, the absorbent 150 may surround the top and side portions of the temperature responsive material 130, for example, so that the temperature responsive material 130 is not exposed to the outside of the absorbent 150 as shown in FIGS. 1 to 3. This may prevent a leak of the temperature responsive material 130 after it is melted after exposure to a temperature above the threshold temperature.

In some examples, the absorbent 150 may change its color after absorbing the insulating material 131 (e.g., without using any separate color-changing ink). For example, as shown in FIGS. 2 and 3, the color of the absorbent 150 may become darker after absorbing the insulating material 131. The color change may include at least one of a change in color, color density, fluorescence, or opacity. In some examples, the color change of the temperature responsive material 130 may be irreversible. In this way, the user of the temperature exposure indicator 100 can be notified about the change in temperature without having to use any separate tool (e.g., RFID reader). In response to being notified about the color change, the user may try to use a separate tool to obtain more accurate information about the change in temperature or temperature exposure history.

The absorbent 150 may be made with a porous material that can absorb the insulating material 131. The size of the pores in the absorbent 150 may be smaller than the size of the conductive particles 132 so that the conductive particles 132 cannot be absorbed into the absorbent 150. Examples of the absorbent 150 may include paper (e.g., TTC paper, WHATMAN filter paper), sorbent materials, and/or mesh sieves. In other examples, the absorbent 150 may be made with any other suitable material (e.g., a material that can absorb the insulating material 131 when it is melted, but does not absorb the conductive particles).

The change in electrical property (e.g., resistance or capacitance) of the temperature exposure indicator 100 may be irreversible. That is, once the electrical property has changed, the changed electrical property may persist after the temperature exposure indicator 100 is no longer exposed to the temperature above the threshold temperature. After a change in electrical property and after a subsequent exposure to a temperature below the respective threshold temperature, the temperature exposure indicator 100 may retain the changed electrical property or may not return to its initial electrical value.

In some examples, at least a predetermined time period of exposure above the threshold temperature may be required for the change in electrical property of the temperature exposure indicator 100 after an initial exposure to the temperature above the threshold temperature. Hereinafter, the predetermined time period is also referred to as a "response time," and these terms will be used interchangeably throughout this application. As described above, the second layer 142 having the conductive particles 132 may be separated from the first and/or second electrodes 111, 112. Therefore, it may take time (e.g., the above-discussed predetermined time period) for the conductive particles 132 to move toward the substrate 105 and/or closer to the first/second electrode 111, 112. Adjusting the distance between the second layer 142 and the substrate 105/first electrode 111/second electrode 112 (e.g., the thickness of the first layer 141) may allow tuning the delay required for the change of the electrical property of the temperature responsive material 130 (and, ultimately, the temperature exposure indicator 100). In some examples, there may be no change of the electrical property of the temperature responsive material 130/temperature exposure indicator 100 when the temperature exposure indicator 100 is exposed to the temperature above the threshold temperature less than the predetermined time period.

In some cases, the change in electrical property may occur after a relatively long time period of exposure of the temperature exposure indicator 100 to a temperature above the threshold temperature. In such cases, the change in electrical property may occur after exposure of the temperature exposure indicator 100 for about 1 hour to about 24 hours to the temperature above the threshold temperature, such as for about 1 hour to about 3 hours, for about 3 hours to about 5 hours, for about 5 hours to about 7 hours, for about 7 hours to about 10 hours, for about 10 hours to about 15 hours, for about 15 hours to about 20 hours, or for about 20 hours to about 24 hours. The predetermined time period may be also in this time range. With a long time to change property in response to an exposure to the temperature above the threshold, the temperature exposure indicator 100 may be used as a time-temperature exposure indicator.

In some examples, the change in electrical property of the temperature exposure indicator may occur after a relatively shorter time period of exposure to the temperature above the threshold temperature. In such cases, the change in electrical property can occur after exposure of the temperature exposure indicator 100 for about 1 minute to about 2 minutes, for about 2 minutes to about 5 minutes, for about 5 minutes to about 10 minutes, for about 10 minutes to about 30 minutes, for about 30 minutes to about 1 hour. The change in electrical property can also occur after exposure of the temperature exposure indicator 100 for about 1 minute or less to the temperature above the threshold temperature, such as for about 30 seconds or less, for about 20 seconds or less, for about 15 seconds or less, for about 10 seconds or less, for about 5 seconds or less, or for about 2 seconds or less. The predetermined time period may be also in this time range. The materials for the temperature responsive material 130 or the distance between the second layer 142 and the first/second electrode 111/112 can be tuned, so that the threshold temperature and the response time can be tied to properties of a perishable product. Shorter time periods may be particularly suitable for detecting products that have warmed up above a temperature—for example if they have been removed from a refrigerator and risen above a maximum allowed temperature that is close to the controlled temperature in the refrigerator. They may also be useful for products that only require a relatively short exposure to high temperature in order to be rendered unfit.

In some examples, the threshold temperature can be about 55° C. to about 65° C., about 57.5° C. to about 62.5° C., about 45° C. to about 55° C., about 42.5° C. to about 47.5° C., about 35° C. to about 45° C., about 25° C. to about 35° C., about 27.5° C. to about 32.5° C., about 10° C. to about 25° C., about 5° C. to about 10° C., about 65° C. or less, about 60° C. or less, about 55° C. or less, about 50° C. or less, about 45° C. or less, about 40° C. or less, about 35° C. or less, about 30° C. or less, about 25° C. or less, about 20° C. or less, about 15° C. or less, or about 10° C. or less. In other examples, the threshold temperature can have any other suitable range.

In some examples, for vaccines (e.g., yellow fever vaccines, hepatitis vaccines, HPV vaccines, rotavirus vaccines, pneumococcal vaccines, cholera vaccines, etc.) that need to be stored between 2° C. and 8° C., the threshold temperature can be about 8° C. In some examples, for medical supplies, diagnostics kits, and/or Controlled Temperature Chain (CTC) vaccines (e.g., MenAfriVac), the threshold temperature can be about 40° C. In some examples, the threshold temperature can be about 10° C. for blood, about 5° C. to about 8° C. for meats/leafy green vegetables, and about 34° C. for chocolate.

In some examples, for a given threshold temperature, the amount of time that is required for the change in electrical property may depend on the difference between the real temperature (to which the temperature exposure indicator is exposed) and the given threshold temperature. For example, when the difference between the real temperature and the given threshold temperature is about 0° C., the amount of time that is required for the change in conductivity (e.g., response time) may be about 1 hour; when the difference is about 1° C., the response time may be about 30 minutes; when the difference is about 2° C., the response time may be about 10 minutes; and when the difference is about 5° C., the response time may be about 1 minute (and as the difference increases, the response time may become flatter and flatter).

In some examples, the length of the first/second electrode 111/112 may be about 0.5 to 3 inches. In other examples, the first/second electrode 111/112 may have any other suitable length. In some examples, the thickness of the first/second electrode 111/112 may be about 1 to about 5 mil, about 5 to about 15 mil, about 15 to about 50 mil, or about 50 to about 100 mil. In other examples, the first/second electrode 111/112 may have any other suitable thickness.

In some examples, the first and second electrodes 111 and 112 may be disposed on the substrate 105. In other examples, at least a portion of the first and second electrodes 111 and 112 may be disposed in the substrate 105. For example, the substrate 105 may be etched and the electrodes 111, 112 may be placed in the etched channels.

Figure 4:
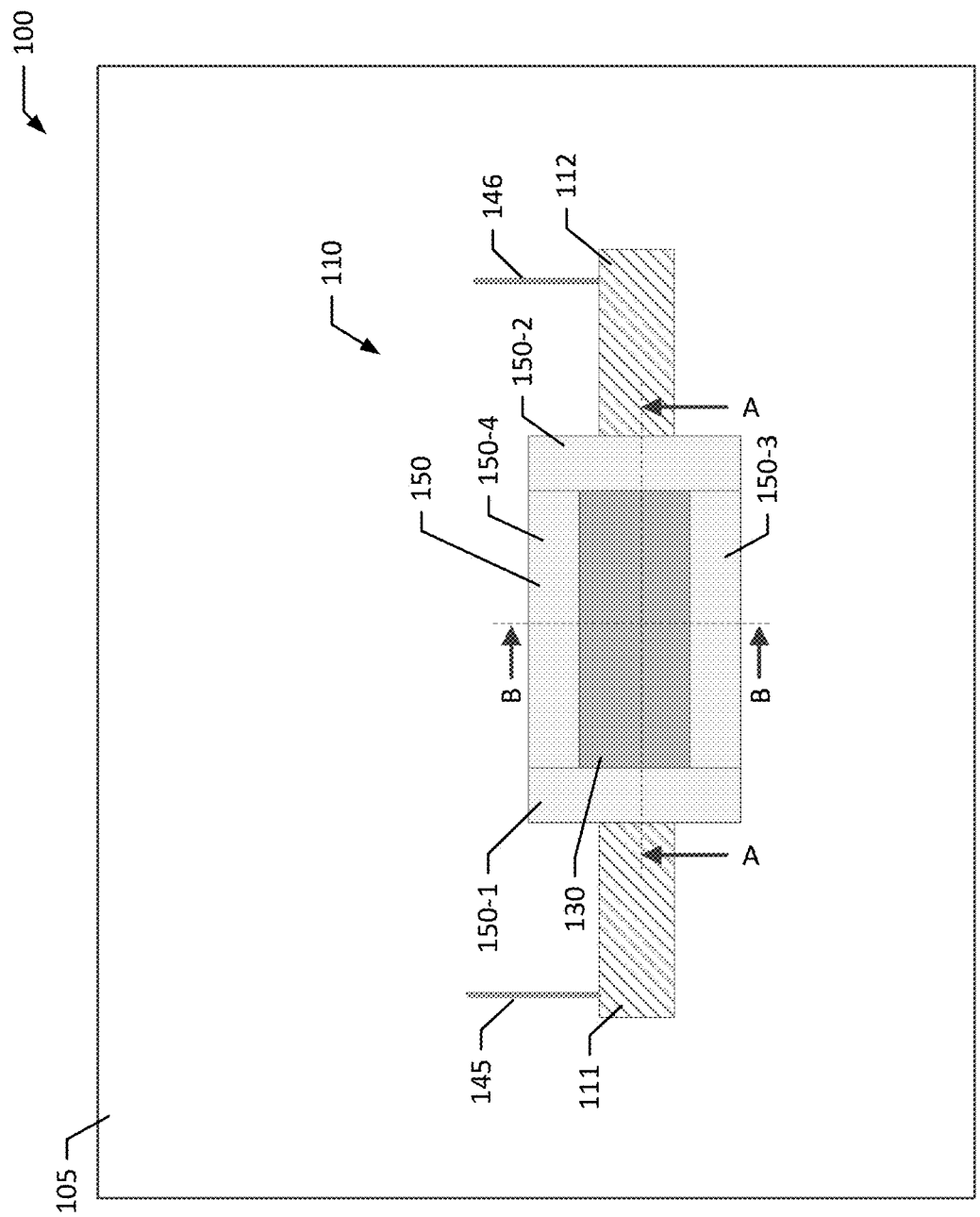
FIG. 4 is a diagram of a temperature exposure indicator according to another example embodiment of the present disclosure.

FIGS. 4-6 illustrate a diagram of a temperature exposure indicator 100 according to another example embodiment of the present disclosure. As shown in FIGS. 4-6, in some examples, the absorbent 150 may be disposed only on the sides of the temperature responsive material 130 (without being disposed on top of the temperature responsive material 130). In some examples, the absorbent 150 may surround the sides of the temperature responsive material 130 as shown in FIG. 4, which may prevent a leak of the temperature responsive material 130 after it is melted after exposure to a temperature above the threshold temperature. For examples, the absorbent 150 may include a first absorbent 150-1 coupled to a left side of the temperature responsive material 130, a second absorbent 150-2 coupled to a right side of the temperature responsive material 130, a third absorbent 150-3 coupled to a front side of the temperature responsive material 130, and a fourth absorbent 150-4 coupled to a back side of the temperature responsive material 130. In other examples, the absorbent 150 may be disposed on only some of the sides of the temperature responsive material (e.g., third and fourth absorbent 150-3, 150-4).

Figure 5A:
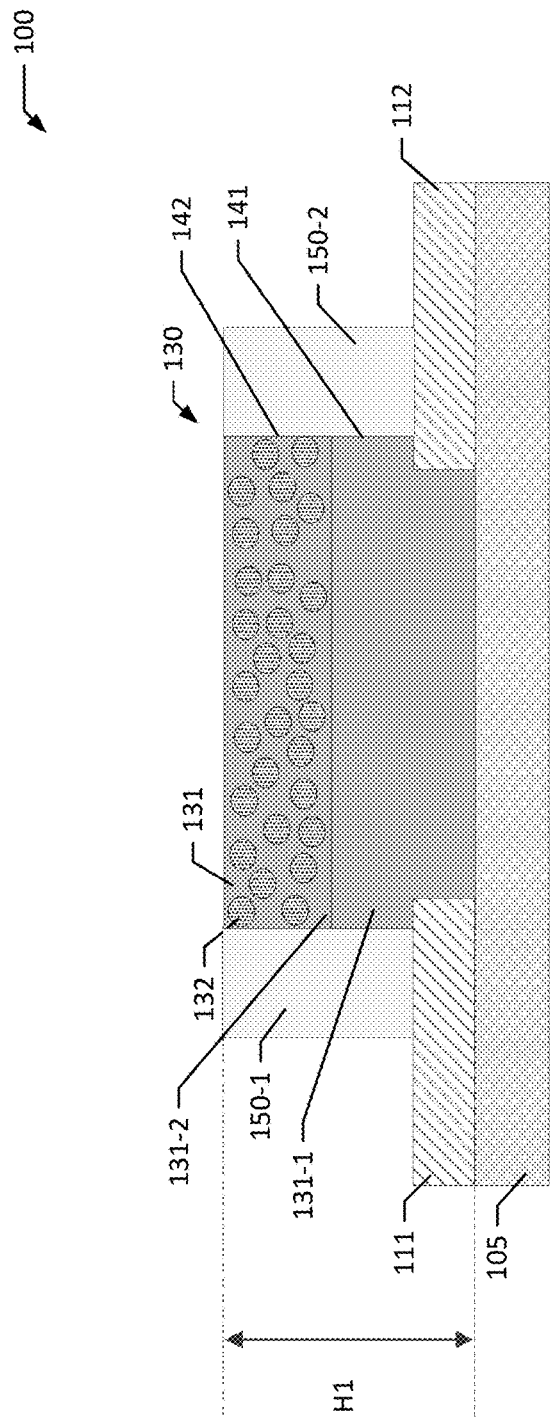
FIG. 5A is an example of a cross-sectional view of the temperature exposure indicator of FIG. 4 along the line of A-A before the temperature exposure indicator is exposed to a temperature above a threshold temperature.
Figure 5B:
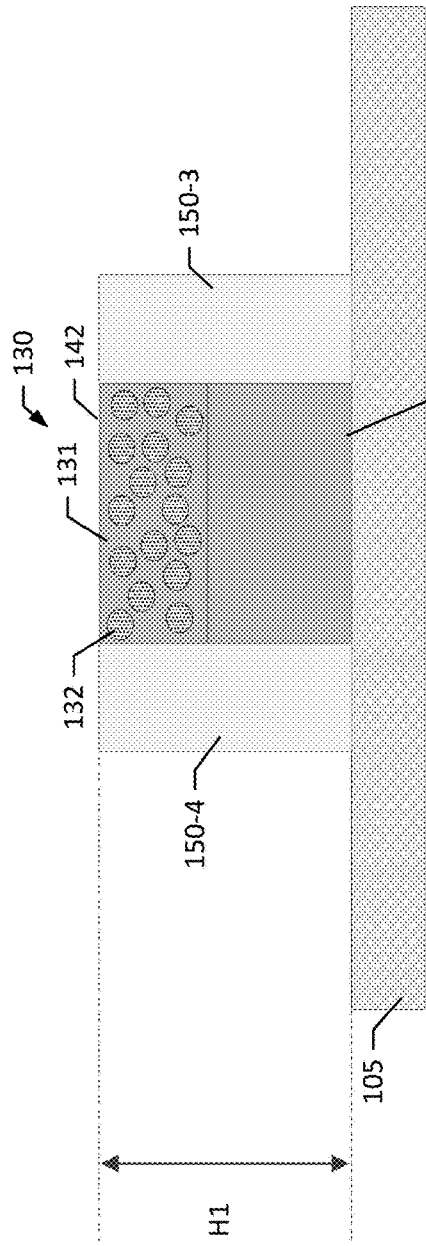
FIG. 5B is an example of a cross-sectional view of the temperature exposure indicator of FIG. 4 along the line of B-B before the temperature exposure indicator is exposed to a temperature above a threshold temperature.

FIGS. 5A and 5B are cross-sectional views of the temperature exposure indicator of FIG. 4 along the line of A-A and the line of B-B, respectively, before the temperature exposure indicator is exposed to a temperature above a threshold temperature. In some examples, the height H1 of the absorbent 150 (e.g., the thickness of the third and fourth absorbents 150), for example measured from the substrate 105 may be the same as the height H1 of the temperature responsive material 130, as shown in FIGS. 5A and 5B. In other examples, the height of the absorbent 150 may be different from (e.g., greater or lower than) the height of the temperature responsive material 130.

Figure 6A:
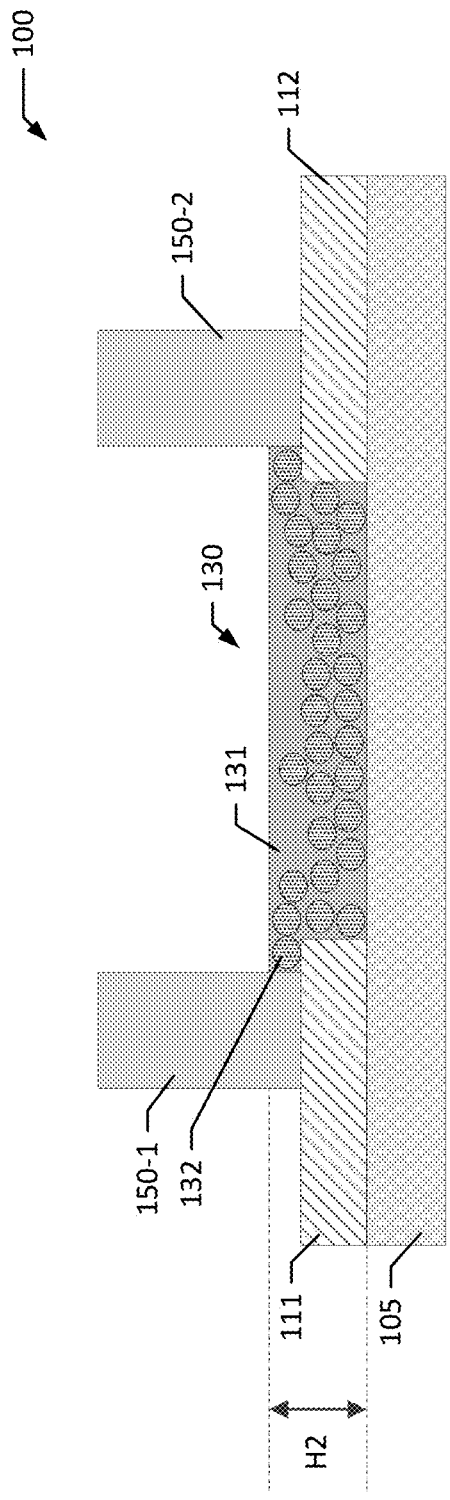
FIG. 6A is an example of a cross-sectional view of the temperature exposure indicator of FIG. 4 along the line of A-A after the temperature exposure indicator is exposed to a temperature above a threshold temperature.
Figure 6B:
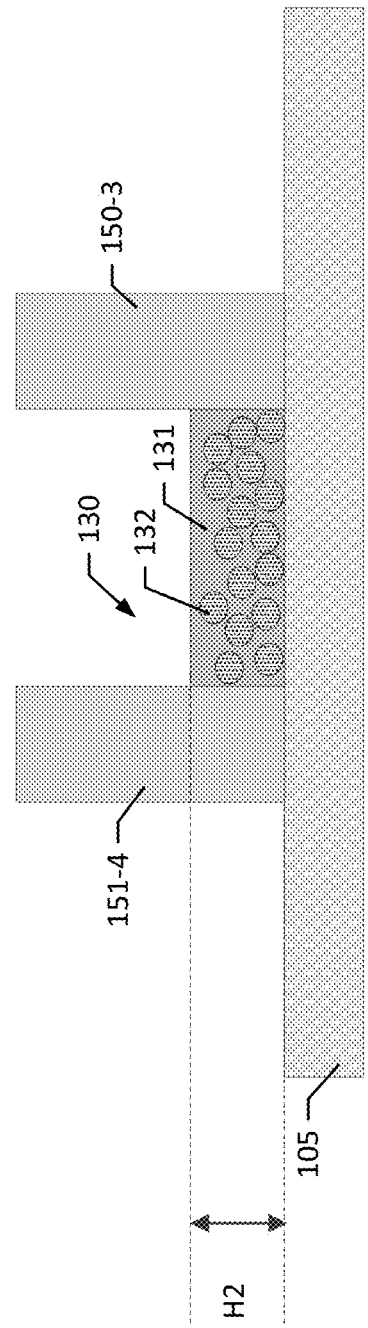
FIG. 6B is an example of a cross-sectional view of the temperature exposure indicator of FIG. 4 along the line of B-B after the temperature exposure indicator is exposed to a temperature above a threshold temperature.

FIGS. 6A and 6B are cross-sectional views of the temperature exposure indicator of FIG. 4 along the line of A-A and the line of B-B, respectively, after the temperature exposure indicator is exposed to a temperature above a threshold temperature. As illustrated in FIGS. 5A, 5B, 6A, and 6B, as a portion of the insulating material 131 of the temperature responsive material 130 (a portion of at least one or both of the first and second parts 131-1, 131-2) is absorbed into the absorbent 150 in response to exposure to the temperature above the predetermined threshold temperature, the conductive particles 132 may move toward the substrate 105 and closer to the first and second electrodes 111, 112; an amount of the insulating material 131 separating the conductive particles 132 from at least one of the first and second electrodes 111, 112 may be reduced; and/or an interstitial space between the conductive particles 132 may be reduced. Not wishing to be bound by theory, it is believed that one or more of the above-discussed changes may create a conductive path (formed by the conductive particles 132) between the first electrode 111 and the second electrode 112, which may cause a change in electrical property of the (remaining/non-absorbed) temperature responsive material 130 and, ultimately, the temperature exposure indicator 100.

As illustrated in FIGS. 5A, 5B, 6A, and 6B, the height of the temperature responsive material 130 (e.g., measured from the substrate 105) may be reduced after the temperature exposure indicator 100 is exposed to a temperature above a threshold temperature (e.g., from H1 to H2) as a portion of the temperature responsive material 130 is absorbed into the absorbent 130. Other configurations/features/characteristics of the temperature exposure indicator of FIG. 4 (e.g., temperature responsive material, threshold temperature, reversibility, color change, response time, material, size of the components, etc.) may be similar to and/or same as the ones described above with respect to the temperature exposure indicator of FIG. 1, and, thus, duplicate description may be omitted.

In some examples, the absorbent 150 may be disposed below the temperature responsive material 130. For example, the absorbent 150 may be disposed between the temperature responsive material 130 and the substrate 105. In other examples, the substrate 105 may serve as the absorbent. In this case, in some examples, no separate absorbent may be provided other than the substrate 105 serving as the absorbent. In other examples, there may be one or more absorbents 150 provided in the temperature exposure indicator 100 (e.g., disposed on the top and/or sides of the temperature responsive material 130) in addition to the substrate 105 serving as the absorbent.

Figure 7:
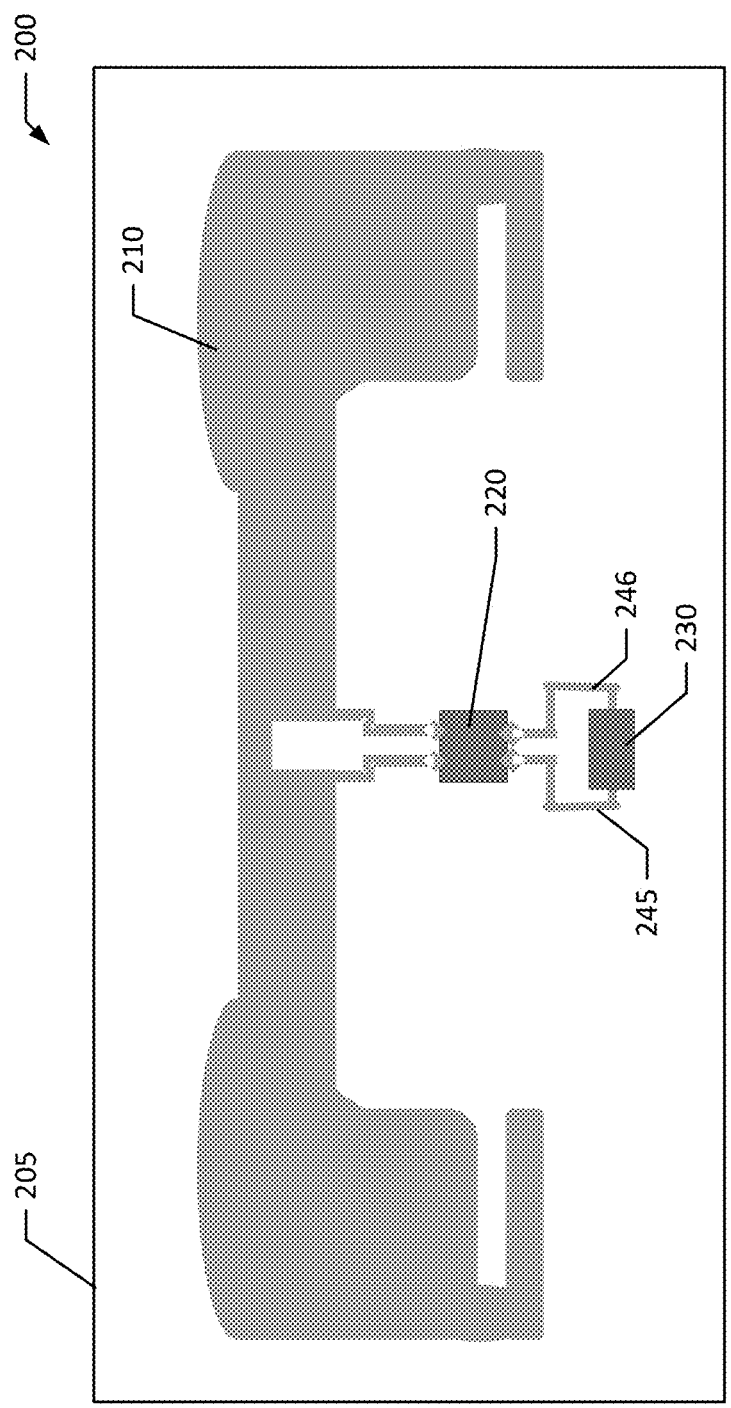
FIG. 7 is a diagram of a radio frequency ID (RFID) tag system according to an example embodiment of the present disclosure.

FIG. 7 illustrates an RFID tag system 200 according to an example embodiment of the present disclosure. The RFID tag system 200 may include an antenna 210, an integrated circuit 220 electrically connected to the antenna 210, and a temperature exposure indicator 230 electrically connected to the integrated circuit 220 and the antenna 210 (e.g., through the integrated circuit 220). The temperature exposure indicator 230 may be one of the temperature exposure indicators described above (e.g., temperature exposure indicator 100). The RFID tag system 200 may further include a first contact terminal 245 connected to one side of the temperature exposure indicator 230 and a second contact terminal 246 connected to the other side of the temperature exposure indicator 230. The temperature exposure indicator 230 may be connected to the integrated circuit 220 through the first/second contact terminals 245/246. The first/second contact terminals 245/246 may be the first/second contact terminals described above (e.g., first/second contact terminals 145/146). The RFID tag system 200 may be configured to change at least one of a frequency response, a resonant frequency, a phase response, a backscatter signal strength, and an antenna gain in response to temperature exposure dependent changes to the electrical property (e.g., resistance, capacitance) of the temperature exposure indicator 230. In some examples, the temperature exposure indicator 230 may be connected to dedicated inputs on the integrated circuit 220 to detect, for example, electrical property value/change of the temperature exposure indicator 230. This electrical property value/change of the temperature exposure indicator 230 may be transmitted by the RFID tag to the reader as data bits (along with Tag ID, etc.). In an alternative embodiment, the resistor/capacitor itself may be part of the RFID circuit, changing the frequency response of the RFID when the capacitance changes.

In some examples, the temperature exposure indicator 230 may be fully or partially printed on a rigid or flexible substrate 205, for example, by screen printing, thermal-transfer printing, gravure, flexographic, ink jet, or slot die coating. In other examples, the temperature exposure indicator 230 may be printed using any other suitable methods.

The temperature exposure indicator 230 may be connected to the integrated circuit 220 and the antenna 210 in parallel. The frequency response of the RFID tag system 200 may be changed based on the threshold temperature and response time of the temperature exposure indicator 230. For example, the threshold temperature and response time of the temperature exposure indicator 230 may be based on the temperature responsive material (e.g., temperature responsive material 130) and design of the temperature exposure indicator 230. In some examples, a change in the electrical property of the temperature exposure indicator 230 may alter the impedance of the entire circuit in the RFID system 200, thus, changing the frequency response.

The change in the electrical property can be made as large or as small as needed. In some examples, the specific threshold temperature and/or response time at which the change in resonant frequency is required can be designed, for example, based on selecting the appropriate material and structure for building the temperature exposure indicator 230.

In some examples, the integrated circuit 220 may be configured to detect an electrical property value or the change in electrical property of the temperature exposure indicator 230. In some examples, the RFID tag system 200 may further include a memory configured to record information indicating the detected electrical property value/change of the temperature exposure indicator 230. In some examples, the RFID tag system 200 may further include an RFID reader configured to receive a communication from the integrated circuit 220 or the memory indicating the detected electrical property value/change in electrical property of the temperature exposure indicator 230.

The temperature exposure indicator 100 and/or the RFID tag system 200 may be used for a temperature-sensitive product having a host product and a container containing the host product. The temperature exposure indicator 100 and/or the RFID tag system 200 may be associated with the host product and/or the container to monitor a temperature change and/or an exposure time of the host product/container. For example, the temperature exposure indicator 100 and/or the RFID tag system 200 may be attached to the host product and/or the container or at a place near the host product and/or the container. Examples of host products include food stuffs, flowers, concrete, batteries, vaccines, drugs, medication, pharmaceuticals, cosmeceuticals, nutri-cosmetics, nutritional supplements, biological materials for industrial or therapeutic uses, medical devices, electrical devices, prophylactics, cosmetics, beauty aids, and perishable munitions and ordnance.

In some examples, the electrical property of the temperature exposure indicator 100 may be read using a resistance meter, capacitance meter, or a multimeter (e.g., BK 878B). In some examples, the temperature exposure indicator 100 may be connected to any suitable RFID chips with dedicated inputs to sense the electrical property change. In such cases, the change in temperature and/or the exposure time may be detected as a change in electrical property by the RFID chip and this information can be stored in a user memory and transmitted to an RFID reader.

Figure 8:
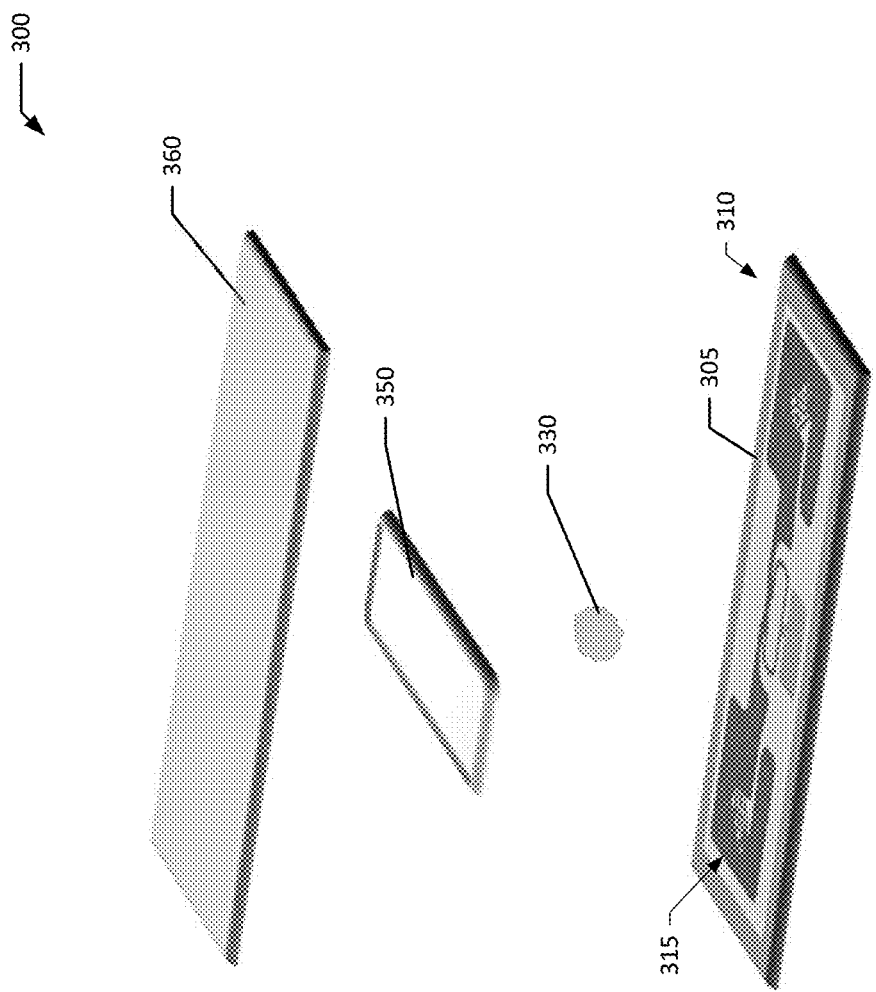
FIG. 8 is an expanded view of an RFID tag system according to an example embodiment of the present disclosure.

FIG. 8 is an expanded view of an RFID tag system 300 according to an example embodiment of the present disclosure. As shown in FIG. 8, the RFID tag system 300 may include an RFID inlay plate 310 having an RFID inlay 315 embedded on a substrate 305 and a protection layer 360. As used herein, the RFID inlay 315 may refer to the components of an RFID tag system (e.g., RFID tag system 200), including an antenna, integrated circuit, electrodes, and space between the electrodes, except for the temperature responsive material (e.g., temperature responsive material 130), the absorbent (e.g., absorbent 150), and the substrate (e.g., substrate 105/205).

The RFID tag system 300 may further include a temperature responsive material 330 and an absorbent 350 between the RFID inlay plate 310 and the protection layer 360. The protection layer 360 may be provided to protect the RFID inlay 315 (e.g., having an antenna, integrated circuit, first/second electrode), the temperature responsive material 330, and/or the absorbent 350. In some examples, the protection layer 360 may be made with an adhesive laminate. In other examples, the protection layer 360 may be made with any other suitable material. The temperature responsive material 330 may be similar to or same as the temperature responsive material described above (e.g., temperature responsive material 130).

Figure 9:
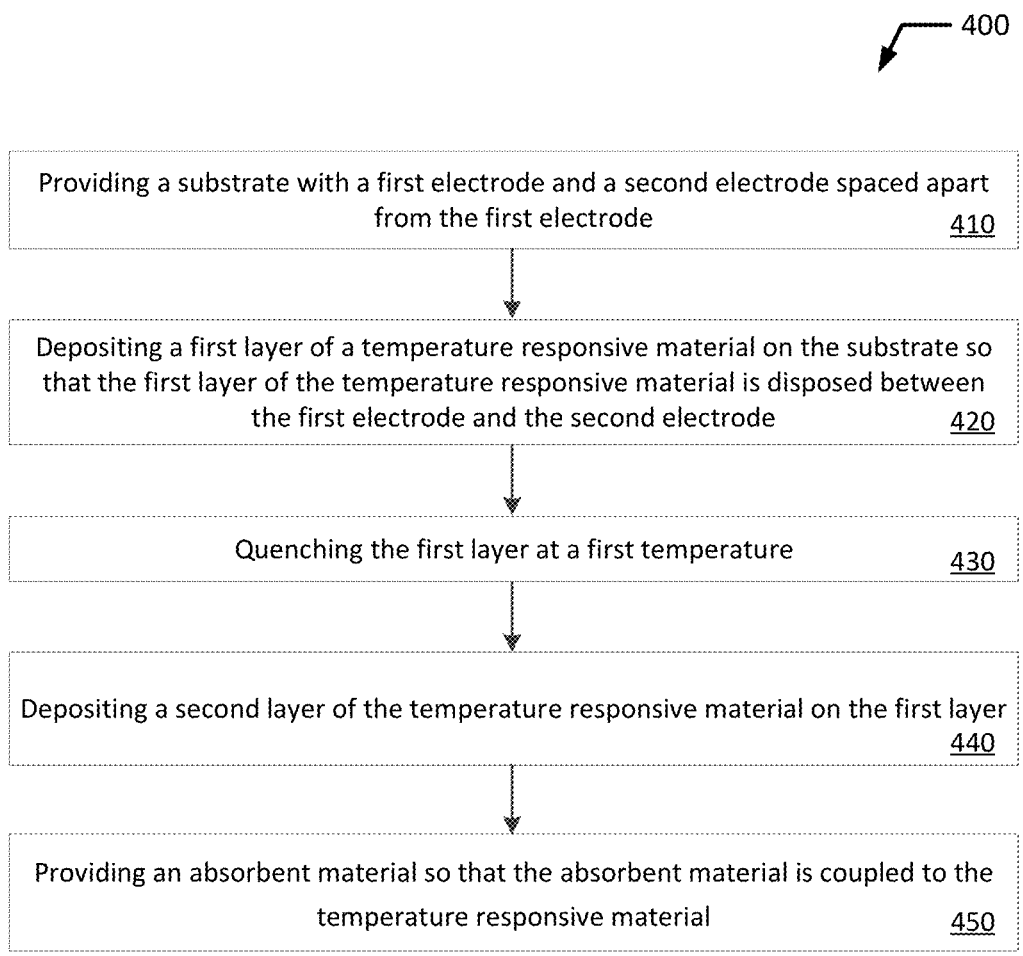
FIG. 9 is a flowchart illustrating an example method for manufacturing a temperature exposure indicator according to an example embodiment of the present disclosure.

FIG. 9 is a flowchart illustrating an example method 400 for manufacturing a temperature exposure indicator according to an example embodiment of the present disclosure. Although the example method 400 is described with reference to the flowchart illustrated in FIG. 9, it will be appreciated that many other methods of performing the acts associated with the method may be used. For example, the order of some of the blocks may be changed, certain blocks may be combined with other blocks, and some of the blocks described are optional.

In the illustrated example, a substrate with a first electrode and a second electrode spaced apart from the first electrode may be provided (block 410). For example, a substrate 105 with a first electrode 111 and a second electrode 112 spaced apart from the first electrode 111 may be provided. Then, a first layer of a temperature responsive material may be deposited on the substrate so that the first layer of the temperature responsive material is disposed between the first electrode and the second electrode (block 420). For example, a first layer 141 of a temperature responsive material 130 may be deposited on the substrate 105 so that the first layer 141 of the temperature responsive material 130 is disposed between the first electrode 111 and the second electrode 112.

Then, the first layer 141 may be quenched at a first temperature (block 430). In some examples, the first temperature may be in a range of about 0° C. to about 20° C., for example, about 0° C. to about 5° C., about 5° C. to about 10° C., about 10° C. to about 15° C., or about 15° C. to about 20° C. In other examples, the first temperature may have any other suitable temperature value.

Then, a second layer of the temperature responsive material may be deposited on the first layer (block 440). For example, a second layer 142 of the temperature responsive material 130 may be deposited on the first layer 141. The second layer 142 may be spaced apart from at least one of the first electrode 111 and the second electrode 112. The first layer 141 and the second layer 142 together may form the temperature responsive material 130. The temperature responsive material 130 may include an insulating material 131 and conductive particles 132. In some examples, the first layer 141 may include a first part 131-1 of the insulating material 130, and the second layer 142 may include a second part 131-2 of the insulating material 131 and the conductive particles 132. Since the second layer 142 is deposited on the first layer 141 after the first layer 141 is quenched, an interface 145 may be formed between the first layer 141 and the second layer 142 (See FIG. 2). In some examples, the second layer 142 may be quenched (e.g., at a temperature similar to or the same as the first temperature) after the second layer 142 is deposited on the first layer 141.

Then, an absorbent material may be provided so that the absorbent material is coupled to the temperature responsive material (block 450). For example, an absorbent material 150 may be provided so that the absorbent material 150 is coupled to the temperature responsive material 130. The insulating material 131 may be configured, in response to exposure to a temperature above a predetermined threshold temperature, to change a state from solid or semi-solid to liquid or semi-liquid so that at least a portion of the insulating material 131 of the temperature responsive material 130 is absorbed into the absorbent material 150, changing an electrical property of the temperature exposure indicator 100.

In some examples, the method 400 may further include, prior to depositing the first layer 141 of the temperature responsive material 130, heating the first layer 141 at a second temperature. Heating the first layer 141 at the second temperature may allow the first layer 141 to be in a liquid or semi-liquid state. The second temperature may be in a range of about 30° C. to about 80° C., for example, about 30° C. to about 40° C., about 40° C. to about 50° C., about 50° C. to about 60° C., about 60° C. to about 70° C., or about 70° C. to about 80° C. In other examples, the second temperature may have any other suitable temperature value.

In some examples, the method 400 may further include, prior to depositing the second layer 142 of the temperature responsive material 130, heating the second layer 142 at a third temperature. Heating the second layer 142 at the third temperature may allow the second layer 142 to be in a liquid or semi-liquid state. The third temperature may be in a range of about 30° C. to about 80° C., for example, about 30° C. to about 40° C., about 40° C. to about 50° C., about 50° C. to about 60° C., about 60° C. to about 70° C., or about 70° C. to about 80° C. In other examples, the third temperature may have any other suitable temperature value.

Other configurations/features/characteristics of the components of the temperature exposure indicator that is manufactured by the method 400 (e.g., temperature responsive material, threshold temperature, reversibility, color change, concentration, volume/weight ratio, response time, material, size of the components, etc.) may be similar to and/or same as the ones described above with respect to the temperature exposure indicator 100 of FIGS. 1-6, and, thus, duplicate description may be omitted.

Figure 10:
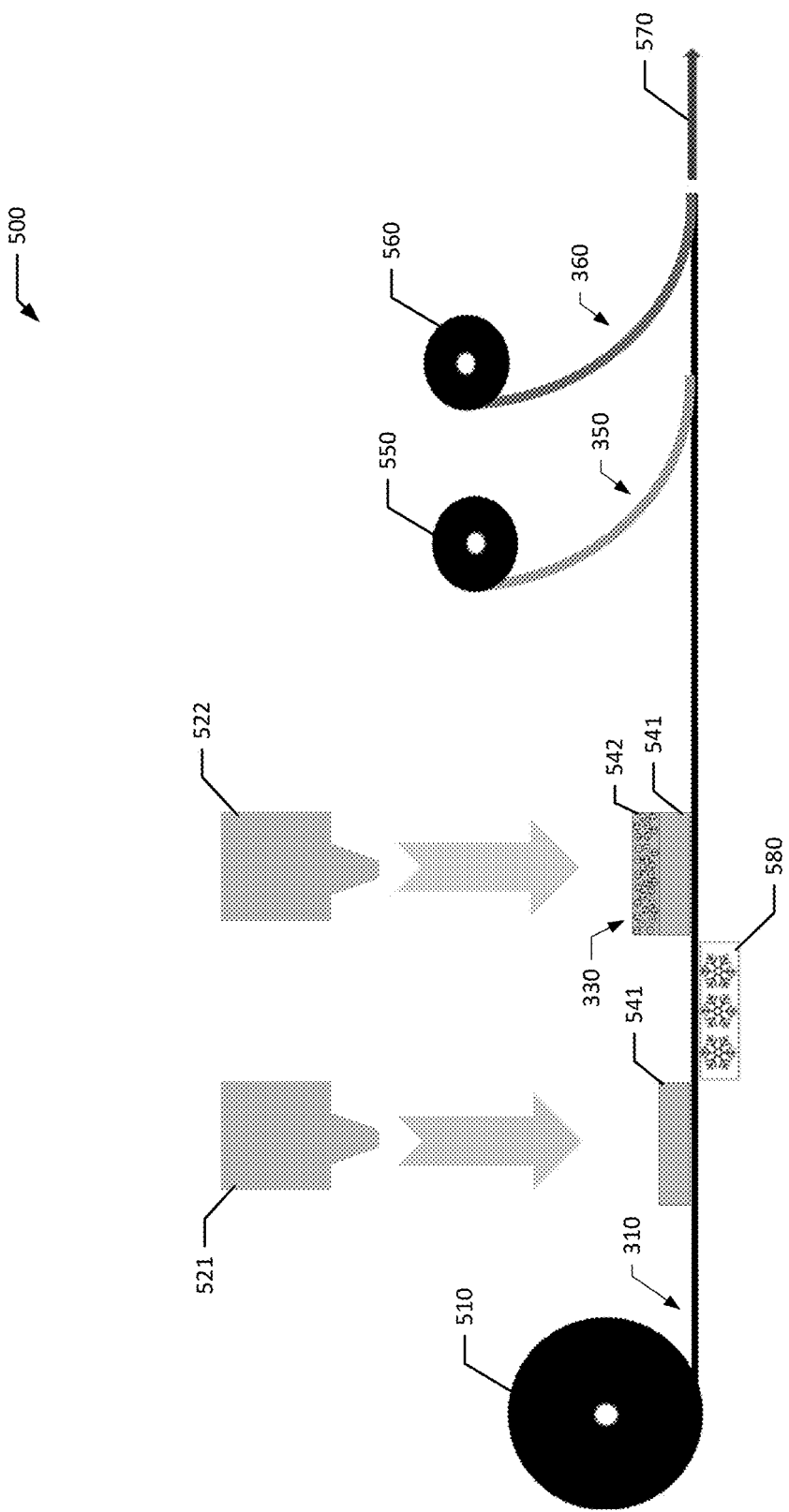
FIG. 10 is a diagram illustrating an example process of assembling an RFID tag system.

FIG. 10 illustrates an example process of assembling an RFID tag system (e.g., RFID tag system 300 of FIG. 8). As shown in FIG. 10, an RFID inlay roll 510, an absorbent roll 550, and a protection layer roll 560 may be provided. The RFID inlay roll 510 may be a rolled continuous film layer of a plurality of the RFID inlay plates 310. Similarly, the absorbent roll 550 and the protection layer roll 560 may be a rolled continuous film layer of the absorbent layer 350 and the protection layer 360, respectively.

In some examples, as the RFID inlay roll 510 is unrolled in a forward direction 570, a first layer 541 of a temperature responsive material 330 may be sprayed/dispensed from a first dispenser valve 521 to the RFID inlay plate 310 of the RFID inlay roll 510 (between the first and second electrodes). In the first dispenser valve 521, the first layer 541 of the temperature responsive material 330 may be heated (e.g., at a temperature in a range of about 30° C. to about 80° C.) so that the first layer 541 is in a liquid or semi-liquid state when it is sprayed/dispensed on the RFID inlay plate 310.

Then, the first layer 541 may be quenched by a cooler 580 (e.g., at a temperature in a range of about 0° C. to about 20° C.). In some examples, the cooler 580 may be provided below the RFID inlay plates 310 unrolled from the RFID inlay roll 510. For example, the cooler 580 may be in the form of a cooling plate disposed underneath the RFID inlay plates 310. In other examples, the cooler 580 can be disposed in any other suitable location and/or have any other suitable form (e.g., air-conditioning system blowing cooling air).

Then, a second layer 542 of the temperature responsive material 330 may be sprayed/dispensed from a second dispenser valve 522 on the first layer 541 of the temperature responsive material 330. In the second dispenser valve 522, the second layer 542 of the temperature responsive material 330 may be heated (e.g., at a temperature in a range of about 30° C. to about 80° C.) so that the second layer 542 is in a liquid or semi-liquid state when it is sprayed/dispensed on the first layer 541. In some examples, the second layer 542 may be quenched, for example, by the cooler 580 (e.g., at a temperature in a range of about 0° C. to about 20° C.) after it is sprayed/dispensed on the first layer 541. The first layer 541 and the second layer 542 together may form the temperature responsive material 330.

The temperature responsive material 330 may include an insulating material and conductive particles. In some examples, the first layer 541 may include a first part of the insulating material, and the second layer 542 may include a second part of the insulating material and the conductive particles. The first layer 541, the second layer 542, and the temperature responsive material 330 may be similar to or same as the first layer 141, the second layer 142, and the temperature responsive material 130 described above and, thus, duplicate description may be omitted.

As the first and second layers 541, 542 of the temperature responsive material 330 are sprayed/dispensed on the RFID inlay plates 310 of the RFID inlay roll 510, the absorbent roll 550 may be unrolled to cover the RFID inlay plate 310 and the temperature responsive material 330 sprayed on the RFID inlay plate 310. Similarly, the protection layer roll 560 may be also unrolled to cover the RFID inlay plate 310 and the temperature responsive material 330. In some examples, as the assembled RFID tag systems 300 are pulled out in the forward direction 570, a cutter device may divide the assembled RFID tag systems 300 from each other in real time. In other examples, the cutter device may start dividing the assembled RFID tag systems 300 from each other after a certain number (e.g., 100, 200, 300) of the RFID tag systems 300 are assembled or after the RFID inlay/absorbent/protection layer roll is fully unrolled.

As discussed above, in some examples, the first layer 541 (including the first part of the insulating material) and the second layer 542 (including the second part of the insulating material and the conductive particles) are dispensed separately from separate dispenser valves 521, 522 to form a temperature responsive material 330. If only one dispenser valve is used to dispense the temperature responsive material 330 at once, the temperature responsive material 330 in the single dispenser valve would have the mix of the insulating material and the conductive particles. However, in this case, it would be difficult to maintain a uniform density of the conductive particles throughout the entire temperature responsive material 330 in the single dispenser valve. For examples, there could be a portion (e.g., bottom portion) of the temperature responsive material 330 within the single dispenser valve where the density of the conductive particles is higher than other portions (e.g., top portion). Therefore, if the temperature responsive material in these high density portions (e.g., bottom portion) within the single dispenser valve is dispensed first during the manufacturing process, it would be difficult to have a uniform product quality. One way to solve this problem is continuously mixing the single dispenser valve, but this may make the manufacturing process complicated and it would increase the overall manufacturing costs.

Aspects of the present disclosure may address the above-discussed issues. For example, the first layer 541 may include mainly or only the insulating material (e.g., without the conductive particles or a minimum amount of the conductive particles) while the second layer 542, which is dispended later, may include mainly the conductive particles (with some insulating material or any other suitable material as a means to deliver the conductive particles). By having these two separate layers and two separate dispensing steps to form the temperature responsive material, the temperature responsive material can have uniform quality (from one temperature exposure indicator to another temperature exposure indicator), where the conductive particles in the second layer 542 are placed on a top portion of the temperature responsive material, being separated from at least one of the first and second electrodes 111, 112, which may also ensure a uniform response (from one temperature exposure indicator to another temperature exposure indicator). This may also make the overall manufacturing process simpler and reduce the manufacturing costs.

EXAMPLES

Various aspects of the subject matter described herein are set out in the following numbered embodiments:

Example 1. A temperature exposure indicator comprises a substrate; a first electrode and a second electrode on the substrate, the second electrode spaced apart from the first electrode; a temperature responsive material disposed between the first electrode and the second electrode, wherein the temperature responsive material comprises an insulating material and conductive particles; and an absorbent coupled to the temperature responsive material, wherein in response to exposure to a temperature above a predetermined threshold temperature, at least a portion of the insulating material of the temperature responsive material is absorbed into the absorbent coupled to the temperature responsive material, changing an electrical property of the temperature responsive material.

Example 2. The temperature exposure indicator of example 1, wherein the temperature responsive material comprises a first layer including a first part of the insulating material; and a second layer including a second part of the insulating material and the conductive particles and disposed on the first layer, wherein the second layer is spaced apart from at least one of the first and second electrodes.

Example 3. The temperature exposure indicator of example 2, wherein the temperature responsive material further comprises an interface between the first layer and the second layer.

Example 4. The temperature exposure indicator of examples 2-3, wherein a concentration of the conductive particles within the second layer is in a range of 30% to 95% by weight or volume.

Example 5. The temperature exposure indicator of examples 2-4, wherein a volume or weight ratio of the conductive particles in the second layer to the second part of the insulating material is in a range of about 95:5 to about 30:70.

Example 6. The temperature exposure indicator of examples 2-5, wherein as the portion of the insulating material of the temperature responsive material is absorbed into the absorbent in response to exposure to the temperature above the predetermined threshold temperature, the conductive particles in the second layer move toward the substrate and closer to the first and second electrodes, which causes the change in electrical property of the temperature exposure indicator.

Example 7. The temperature exposure indicator of examples 2-6, wherein as the portion of the insulating material of the temperature responsive material is absorbed into the absorbent in response to exposure to the temperature above the predetermined threshold temperature, an amount of the insulating material separating the conductive particles from at least one of the first and second electrodes is reduced, which causes the change in electrical property of the temperature exposure indicator.

Example 8. The temperature exposure indicator of examples 2-7, wherein as the portion of the insulating material of the temperature responsive material is absorbed into the absorbent in response to exposure to the temperature above the predetermined threshold temperature, an interstitial space between the conductive particles is reduced, which causes the change in electrical property of the temperature exposure indicator.

Example 9. The temperature exposure indicator of examples 1-8, wherein the insulating material comprises a polymer matrix having a side-chain crystalline polymer.

Example 10. The temperature exposure indicator of example 9, wherein the polymer matrix further comprises at least one of alkane and microcrystalline wax.

Example 11. The temperature exposure indicator of examples 1-10, wherein the absorbent comprises a paper.

Example 12. The temperature exposure indicator of examples 1-11, wherein the electrical property of the temperature exposure indicator that is changed in response to exposure to the temperature above the predetermined threshold temperature is at least one of a resistance or a capacitance.

Example 13. The temperature exposure indicator of examples 1-12, wherein the insulating material cannot be absorbed into the substrate.

Example 14. The temperature exposure indicator of examples 1-13, wherein the change in electrical property of the temperature exposure indicator occurs after exposure to the temperature above the predetermined threshold temperature for a predetermined amount of time or less.

Example 15. The temperature exposure indicator of example 14, wherein the predetermined amount of time is 30 seconds or less.

Example 16. The temperature exposure indicator of example 14, wherein the predetermined amount of time is 1 hour or less.

Example 17. The temperature exposure indicator of examples 1-16, wherein the change in electrical property of the temperature exposure indicator is irreversible.

Example 18. The temperature exposure indicator of examples 1-17, wherein the predetermined threshold temperature is in a range of about 20° C. to about 65° C.

Example 19. The temperature exposure indicator of examples 1-18, wherein in response to exposure to the temperature above the predetermined threshold temperature, the insulating material is configured to change its state from a solid or semi-solid to a liquid or a semi-liquid.

Example 20. The temperature exposure indicator of examples 1-19, wherein a concentration of the conductive particles within the temperature responsive material by weight or volume before the temperature exposure indicator is exposed to the temperature above the predetermined threshold temperature is in a range of about 20% to about 60%.

Example 21. The temperature exposure indicator of examples 1-20, wherein a concentration of the conductive particles within the temperature responsive material by weight or volume after the temperature exposure indicator is exposed to the temperature above the predetermined threshold temperature is in a range of about 60% to about 99%.

Example 22. An RFID tag comprises an antenna; an integrated circuit electrically connected to the antenna; and the temperature exposure indicator of any one of examples 1-21, wherein the temperature exposure indicator is electrically connected to the antenna and the integrated circuit, wherein the integrated circuit is configured to detect, via the antenna, the electrical property or the change in electrical property of the temperature exposure indicator.

Example 23. The RFID tag of example 22, wherein the RFID tag is configured to change at least one of a frequency response, a resonant frequency, a phase response, a backscatter signal strength, and an antenna gain in response to the change in electrical property of the temperature exposure indicator.

Example 24. The RFID tag of examples 22-23 further comprises a memory configured to record information indicating the detected change in electrical property of the temperature exposure indicator.

Example 25. The RFID tag of example 24, wherein the integrated circuit or the memory is configured to transmit a communication to an RFID reader via the antenna, indicating the detected change in electrical property of the temperature exposure indicator.

Example 26. A temperature sensitive product, comprises a host product; and the temperature exposure indicator of any one of examples 1-21 or the RFID tag of any one of examples 22-25, wherein the temperature exposure indicator is associated with the host product to monitor the change in temperature of the host product.

Example 27. The temperature sensitive product of example 26, wherein the host product comprises a product selected from the group consisting of food stuffs, flowers, concrete, batteries, vaccines, drugs, medication, pharmaceuticals, cosmeceuticals, nutricosmetics, nutritional supplements, biological materials for industrial or therapeutic uses, medical devices, electrical devices, prophylactics, cosmetics, beauty aids, and perishable munitions and ordnance.

Example 28. A method for manufacturing a temperature exposure indicator comprises providing a substrate with a first electrode and a second electrode spaced apart from the first electrode; depositing a first layer of a temperature responsive material on the substrate so that the first layer of the temperature responsive material is disposed between the first electrode and the second electrode; quenching the first layer at a first temperature; depositing a second layer of the temperature responsive material on the first layer, wherein the second layer is spaced apart from at least one of the first electrode and the second electrode, wherein the first layer and the second layer together form the temperature responsive material, wherein the temperature responsive material comprises an insulating material and conductive particles; providing an absorbent material so that the absorbent material is coupled to the temperature responsive material, wherein the insulating material is configured, in response to exposure to a temperature above a predetermined threshold temperature, to change a state from solid or semi-solid to liquid or semi-liquid so that at least a portion of the insulating material of the temperature responsive material is absorbed into the absorbent material, changing an electrical property of the temperature exposure indicator.

Example 29. The method of example 28, wherein the first temperature is in a range of about 0° C. to about 20° C.

Example 30. The method of examples 28-29 further comprises, prior to depositing the first layer of the temperature responsive material, heating the first layer at a second temperature, causing the first layer to be in a liquid or semi-liquid state.

Example 31. The method of example 30, wherein the second temperature is in a range of about 30° C. to about 80° C.

Example 32. The method of examples 28-31 further comprises, prior to depositing the second layer of the temperature responsive material, heating the second layer at a third temperature, causing the second layer to be in a liquid or semi-liquid state.

Example 33. The method of example 32, wherein the third temperature is in a range of about 30° C. to about 80° C.

Example 34. The method of examples 28-33, wherein the first layer includes a first part of the insulating material, and the second layer includes a second part of the insulating material and the conductive particles.

Example 35. The method of example 34, wherein a concentration of the conductive particles within the second layer is in a range of about 30% to about 95%.

Example 36. The temperature exposure indicator of examples 34-35, wherein a volume or weight ratio of the conductive particles in the second layer to the second part of the insulating material is in a range of about 95:5 to about 30:70.

Example 37. The method of examples 34-36, wherein as the portion of the insulating material of the temperature responsive material is absorbed into the absorbent substrate in response to exposure to the temperature above the predetermined threshold temperature, the conductive particles in the second layer move toward the substrate and closer to the first and second electrodes, which causes the change in electrical property of the temperature exposure indicator.

Example 38. The method of examples 28-37, wherein an interface is formed between the first layer and the second layer.

Example 39. The method of examples 28-38, wherein the insulating material comprises a polymer matrix having a side-chain crystalline polymer.

Example 40. The method of example 39, wherein the polymer matrix further comprises at least one of alkane and microcrystalline wax.

Example 41. The method of examples 28-40, wherein the absorbent material comprises a paper.

Example 42. The method of examples 28-41, wherein the electrical property of the temperature exposure indicator that is changed in response to exposure to the temperature above the predetermined threshold temperature is at least one of a resistance or a capacitance.

Example 43. The method of examples 28-42, wherein the insulating material cannot be absorbed into the substrate.

Example 44. The method of examples 28-43, wherein the change in electrical property of the temperature exposure indicator occurs after exposure to the temperature above the predetermined threshold temperature for a predetermined amount of time or less.

Example 45. The method of example 44, wherein the predetermined amount of time is 30 seconds or less.

Example 46. The method of example 44, wherein the predetermined amount of time is 1 hour or less.

Example 47. The method of examples 28-46, wherein the change in electrical property of the temperature exposure indicator is irreversible.

Example 48. The method of examples 28-47, wherein the predetermined threshold temperature is in a range of about 20° C. to about 65° C.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Reference throughout the specification to "various aspects," "some aspects," "some examples," "other examples," "some cases," or "one aspect" means that a particular feature, structure, or characteristic described in connection with the aspect is included in at least one example. Thus, appearances of the phrases "in various aspects," "in some aspects," "certain embodiments," "some examples," "other examples," "certain other embodiments," "some cases," or "in one aspect" in places throughout the specification are not necessarily all referring to the same aspect. Furthermore, the particular features, structures, or characteristics illustrated or described in connection with one example may be combined, in whole or in part, with features, structures, or characteristics of one or more other aspects without limitation.

When the position relation between two parts is described using the terms such as "on," "above," "below," "under," and "next," one or more parts may be positioned between the two parts unless the terms are used with the term "immediately" or "directly." Similarly, as used herein, the terms "attachable," "attached," "connectable," "connected," or any similar terms may include directly or indirectly attachable, directly or indirectly attached, directly or indirectly connectable, and directly or indirectly connected.

It is to be understood that at least some of the figures and descriptions herein have been simplified to illustrate elements that are relevant for a clear understanding of the disclosure, while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements is not provided herein.

The terminology used herein is intended to describe particular embodiments only and is not intended to be limiting of the present disclosure. As used herein, the singular forms "a," "an," and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "at least one of X or Y" or "at least one of X and Y" should be interpreted as X, or Y, or X and Y.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A temperature exposure indicator comprising:
a substrate;
a first electrode and a second electrode on the substrate, the second electrode spaced apart from the first electrode;
a temperature responsive material disposed between the first electrode and the second electrode, wherein the temperature responsive material comprises an insulating material and conductive particles, the temperature responsive material having an initial electrical property; and
an absorbent coupled to the temperature responsive material,
wherein the insulating material is configured to liquefy in response to exposure to a temperature above a predetermined threshold temperature, and
wherein the absorbent is configured to absorb at least a portion of the liquified insulating material, such that an electrical property of a remaining portion of the temperature responsive material not absorbed by the absorbent is changed from the initial electrical property of the temperature responsive material to a changed electrical property.

2. The temperature exposure indicator of claim 1, wherein the temperature responsive material comprises:
a first layer including a first part of the insulating material; and
a second layer including a second part of the insulating material combined with the conductive particles the second layer disposed on the first layer, wherein the second layer is spaced apart from at least one of the first and second electrodes.

3. The temperature exposure indicator of claim 2, wherein a concentration of the conductive particles within the second layer is in a range of 30% to 95% by weight or volume.

4. The temperature exposure indicator of claim 2, wherein a volume or weight ratio of the conductive particles in the second layer to the second part of the insulating material is in a range of 95:5 to 30:70.

5. The temperature exposure indicator of claim 2, wherein as the portion of the insulating material of the temperature responsive material is absorbed into the absorbent in response to exposure to the temperature above the predetermined threshold temperature, the conductive particles in the second layer move toward the substrate and closer to the first and second electrodes, which causes the change in electrical property of the temperature exposure indicator.

6. The temperature exposure indicator of claim 2, wherein as the portion of the insulating material of the temperature responsive material is absorbed into the absorbent in response to exposure to the temperature above the predetermined threshold temperature, an amount of the insulating material separating the conductive particles from at least one of the first and second electrodes is reduced, which causes the change in electrical property of the temperature exposure indicator.

7. The temperature exposure indicator of claim 2, wherein as the portion of the insulating material of the temperature responsive material is absorbed into the absorbent in response to exposure to the temperature above the predetermined threshold temperature, an interstitial space between the conductive particles is reduced, which causes the change in electrical property of the temperature exposure indicator.

8. The temperature exposure indicator of claim 1, wherein the insulating material comprises a polymer matrix having a side-chain crystalline polymer.

9. The temperature exposure indicator of claim 8, wherein the polymer matrix further comprises at least one of alkane and microcrystalline wax.

10. The temperature exposure indicator of claim 1, wherein the absorbent comprises a paper.

11. The temperature exposure indicator of claim 1, wherein the initial electrical property of the temperature exposure indicator and the changed electric property are different resistance values.

12. The temperature exposure indicator of claim 1, wherein the change in electrical property of the temperature exposure indicator occurs after exposure to the temperature above the predetermined threshold temperature for at least a predetermined amount of time.

13. The temperature exposure indicator of claim 1, wherein the predetermined threshold temperature is in a range of 20° C. to 65° C.

14. The temperature exposure indicator of claim 1, wherein in response to exposure to the temperature above the predetermined threshold temperature, the insulating material is configured to change its state from a solid or semi-solid to a liquid or a semi-liquid.

15. The temperature exposure indicator of claim 1, wherein a concentration of the conductive particles within the temperature responsive material by weight or volume before the temperature exposure indicator is exposed to the temperature above the predetermined threshold temperature is in a range of 20% to 60%.

16. The temperature exposure indicator of claim 1, wherein a concentration of the conductive particles within the temperature responsive material by weight or volume after the temperature exposure indicator is exposed to the temperature above the predetermined threshold temperature is in a range of 60% to 99%.

17. An RFID tag comprising:
an antenna;
an integrated circuit electrically connected to the antenna; and
the temperature exposure indicator of claim 1, wherein the temperature exposure indicator is electrically connected to the antenna and the integrated circuit,
wherein the integrated circuit is configured to detect, the change in electrical property of the temperature exposure indicator and to communicate an indication of the change in electrical property via the antenna.

18. The RFID tag of claim 17, wherein the RFID tag is configured to change at least one of a frequency response, a resonant frequency, a phase response, a backscatter signal strength, and an antenna gain in response to the change in electrical property of the temperature exposure indicator.

19. The temperature exposure indicator of claim 1, wherein the initial electrical property of the temperature exposure indicator and the changed electric property are different values of a dielectric constant of the temperature responsive material.

20. A method for manufacturing a temperature exposure indicator, the method comprising:
providing a substrate with a first electrode and a second electrode spaced apart from the first electrode;
depositing a first layer of a temperature responsive material on the substrate so that the first layer of the temperature responsive material is disposed between the first electrode and the second electrode;
quenching the first layer at a first temperature;
depositing a second layer of the temperature responsive material on the first layer, wherein the second layer is spaced apart from at least one of the first electrode and the second electrode, wherein the first layer and the second layer together form the temperature responsive material, wherein the temperature responsive material comprises an insulating material and conductive particles and has an initial electrical property;
providing an absorbent material so that the absorbent material is coupled to the temperature responsive material,
wherein the insulating material is configured, in response to exposure to a temperature above a predetermined threshold temperature, to change a state from solid or semi-solid to liquid or semi-liquid so that at least a portion of the insulating material of the temperature responsive material is absorbed into the absorbent material, so that a remaining portion of the temperature exposure indicator has a changed electrical property.

21. The method of claim 20, wherein the first layer includes a first part of the insulating material, and the second layer includes a second part of the insulating material and the conductive particles.

22. The method of claim 20, wherein an interface is formed between the first layer and the second layer.

23. A temperature exposure indicator comprising:
a substrate,
a first electrode and a second electrode on the substrate, the second electrode spaced apart from the first electrode;
a temperature responsive structure coupled to the first electrode and the second electrode and having an initial electrical property, comprising:
a first layer including a temperature responsive insulating material, the first layer disposed in a location between the first electrode and the second electrode, and a second layer including conductive particles, the second layer blocked from contact with at least one of the first electrode and the second electrode by the first layer;

an absorbent coupled to the temperature responsive structure;

wherein the temperature responsive insulating material is configured to liquefy responsive to an exposure to a temperature above a predetermined temperature exposure threshold;

wherein the absorbent is configured to absorb a portion of the liquified temperature responsive insulating material, removing the portion of the temperature responsive insulating material from the location, wherein, when the temperature responsive insulating material is absorbed by the absorbent, the conductive particles are configured to move into the location, causing a remaining portion of the temperature responsive structure to have a changed electrical property.

24. The temperature exposure indicator of claim 23, wherein the absorbent is impermeable with respect to the conductive particles.

25. The temperature exposure indicator of claim 23, wherein the first layer also includes conductive particles, and the second layer also includes the temperature responsive insulating material, wherein a concentration of conductive particles in the first layer is less than a concentration of conductive particles in the second layer.

* * * * *